US009638118B2

(12) United States Patent
Schaller et al.

(10) Patent No.: US 9,638,118 B2
(45) Date of Patent: May 2, 2017

(54) SYSTEM AND METHOD FOR SUPPLYING NATURAL GAS TO DUAL FUEL ENGINE

(71) Applicant: Caterpillar Inc., Peoria, IL (US)

(72) Inventors: David F. Schaller, Dunlap, IL (US); James M. Voelker, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 83 days.

(21) Appl. No.: 14/681,400

(22) Filed: Apr. 8, 2015

(65) Prior Publication Data

US 2016/0298556 A1    Oct. 13, 2016

(51) Int. Cl.
*F02D 41/00* (2006.01)
*F02D 19/06* (2006.01)
*F02M 21/06* (2006.01)
*F02D 19/10* (2006.01)

(52) U.S. Cl.
CPC ..... *F02D 41/0027* (2013.01); *F02D 19/0605* (2013.01); *F02D 19/0628* (2013.01); *F02D 19/0647* (2013.01); *F02D 19/0673* (2013.01); *F02M 21/06* (2013.01); *F02D 19/10* (2013.01); *F02D 41/0025* (2013.01); *F02D 2200/0606* (2013.01)

(58) Field of Classification Search
CPC .... Y02T 10/32; Y02T 10/36; F17C 2221/033; F17C 2265/066; F02D 41/0027
USPC .......................... 123/575–578, 525
See application file for complete search history.

(56) References Cited

U.S. PATENT DOCUMENTS

| 3,822,563 | A |   | 7/1974  | Orth |
|---|---|---|---|---|
| 5,081,977 | A | * | 1/1992  | Swenson ................. F02B 43/00 123/1 A |
| 5,375,580 | A |   | 12/1994 | Stolz et al. |
| 5,375,582 | A |   | 12/1994 | Wimer |
| 5,483,943 | A | * | 1/1996  | Peters ................ F02M 21/0239 123/527 |
| 5,499,615 | A |   | 3/1996  | Lawrence et al. |
| 6,026,789 | A | * | 2/2000  | Arai ....................... F02M 21/06 123/557 |
| 6,345,611 | B1 | * | 2/2002  | Hartman ................ F02M 31/10 123/3 |
| 8,499,569 | B2 |   | 8/2013  | Van Tassel |
| 2008/0276627 | A1 |   | 11/2008 | Lee et al. |

(Continued)

FOREIGN PATENT DOCUMENTS

EP    2609007    7/2013

*Primary Examiner* — Long T Tran
(74) *Attorney, Agent, or Firm* — Mattingly, Burke, Cohen & Biederman

(57) ABSTRACT

A natural gas system for an intake manifold of a dual fuel engine is provided. The natural gas system includes a heat exchanger configured to exchange heat with a first stream of natural gas passing therethrough. The natural gas system further includes a temperature regulating assembly positioned downstream of the heat exchanger with respect to the first stream of the natural gas. The temperature regulating assembly includes a conduit having an inlet and an outlet. The temperature regulating assembly also includes a supply line in selective fluid communication with the conduit. The temperature regulating assembly further includes a temperature sensing assembly provided within the conduit. Further, the introduction of the second stream is based on a temperature of the natural gas within the conduit.

20 Claims, 4 Drawing Sheets

(56) References Cited

U.S. PATENT DOCUMENTS

| | | | | |
|---|---|---|---|---|
| 2009/0064586 A1* | 3/2009 | Munshi | ............ | B60K 15/03006 |
| | | | | 48/127.9 |
| 2013/0306029 A1* | 11/2013 | Stockner | ............ | F02M 21/0245 |
| | | | | 123/445 |
| 2013/0333666 A1* | 12/2013 | Ebner | ................ | F02D 19/0605 |
| | | | | 123/445 |
| 2014/0182551 A1* | 7/2014 | Steffen | ................ | F02D 19/0647 |
| | | | | 123/446 |
| 2014/0216403 A1* | 8/2014 | Stockner | ................ | F02M 69/08 |
| | | | | 123/445 |

\* cited by examiner

SYSTEM AND METHOD FOR SUPPLYING NATURAL GAS TO DUAL FUEL ENGINE

TECHNICAL FIELD

The present disclosure relates to a natural gas system, and more particularly to the natural gas system for a dual fuel engine.

BACKGROUND

Some engines are powered by more than just one fuel, for example, a combination of natural gas and diesel fuel may be used to power such dual fuel engines. The use of natural gas may allow significant saving in fuel costs while also maintaining diesel engine performance levels. In these dual fuel engines, the diesel fuel may act as an igniter for the natural gas inside a combustion chamber of a cylinder of the engine. These engines initially operate using diesel fuel and as temperature of inlet air rises, the natural gas is injected into the cylinder. As the natural gas is injected, the amount of the diesel fuel being consumed is reduced.

The natural gas is generally stored in a tank in a partially liquid and gaseous form. The natural gas is stored in the tank at a very low temperature. Accordingly, some heating means is associated with the tank, in order to increase the temperature of the natural gas before introduction into an intake manifold of the engine. In one example, engine coolant may be used to heat the natural gas. However, the coolant may have a relatively higher temperature due to heat exchange with components of the engine. In some examples, the temperature of the coolant may be approximately as high as 95° C. Accordingly, during the heat exchange with the coolant, the natural gas may also become very heated. Sometimes, uncontrolled increase in the temperature of the natural gas may affect the overall working of the engine. In some examples, the heated natural gas may heat up a gas shut-off valve associated the engine.

U.S. Published Application Number 2008/0276627 describes a fuel gas supply system. The fuel gas supply system is associated with a ship and is provided for supplying fuel gas to a high-pressure gas injection engine of the ship, wherein the ship has an LNG fuel tank for storing LNG as fuel and LNG is extracted from an LNG fuel tank of the ship, compressed at a high pressure, gasified, and then supplied to the high-pressure gas injection engine.

SUMMARY OF THE DISCLOSURE

In one aspect of the present disclosure, a natural gas system for an intake manifold of a dual fuel engine is provided. The natural gas system includes a heat exchanger configured to exchange heat with a first stream of natural gas passing therethrough. The natural gas system further includes a temperature regulating assembly positioned downstream of the heat exchanger with respect to the first stream of the natural gas. The temperature regulating assembly includes a conduit having an inlet configured to receive the first stream of the natural gas and an outlet. The temperature regulating assembly also includes a supply line in selective fluid communication with the conduit. The supply line is disposed between the inlet and the outlet of the conduit. The supply line is configured to introduce a second stream of natural gas into the conduit, wherein a temperature of the second stream is lower than a temperature of the first stream. The temperature regulating assembly further includes a temperature sensing assembly provided within the conduit. Further, the introduction of the second stream is based on a temperature of the natural gas within the conduit.

In another aspect of the present disclosure, a dual fuel engine system is provided. The dual fuel engine system includes a tank configured to store natural gas. The dual fuel engine system also includes a heat exchanger in fluid communication with a first stream of the natural gas passing therethrough. The dual fuel engine system further includes a temperature regulating assembly positioned downstream of the heat exchanger with respect to the first stream of the natural gas. The temperature regulating assembly includes a conduit having an inlet and an outlet. The temperature regulating assembly also includes a supply line in selective fluid communication with the conduit via a port. The supply line is configured to introduce a second stream of natural gas into the conduit, wherein a temperature of the second stream is lower than a temperature of the first stream. The temperature regulating assembly further includes a temperature sensing assembly provided within the conduit. The temperature sensing assembling is configured to control an opening of the port based on a temperature of the natural gas within the conduit. The dual fuel system includes an intake manifold in fluid communication with the outlet of the conduit.

In yet another aspect of the present disclosure, a method for regulating an introduction temperature of natural gas into an intake manifold of a dual fuel engine is provided. The method includes introducing a first stream of the natural gas into a heat exchanger. The method also includes introducing the heated first stream of the natural gas into an inlet of the conduit. The method further includes selectively introducing a second stream of the natural gas into the conduit based on a temperature of the natural gas within the conduit, wherein a temperature of the second stream of the natural gas is lower than a temperature of the first stream of the natural gas.

Other features and aspects of this disclosure will be apparent from the following description and the accompanying drawings.

DETAILED DESCRIPTION

Figure 1:
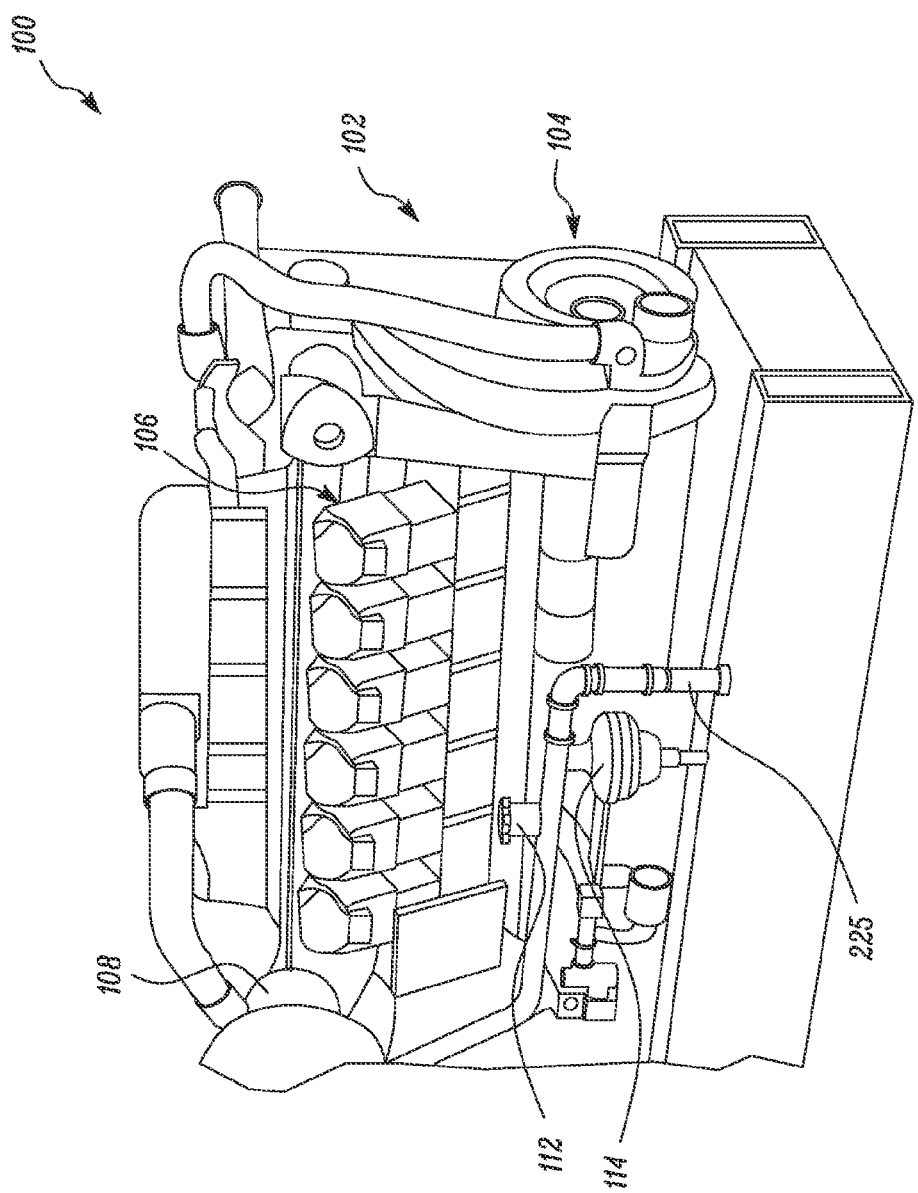
FIG. 1 is a perspective view of an exemplary engine system, according to one embodiment of the present disclosure.

Wherever possible, the same reference numbers will be used throughout the drawings to refer to the same or the like parts. Referring to FIG. 1, a perspective view of an exemplary engine system 102 is illustrated. The engine system 100 is embodied as a dual fuel engine system. In one example, the engine system 100 may embody a dynamic gas blending engine system. The engine system 100 includes an engine 102, which may be an internal combustion engine, such as, a reciprocating piston engine or a gas turbine engine. Alternatively, the engine 102 may be spark ignition engine or a compression ignition engine, such as, a diesel engine, a homogeneous charge compression ignition engine, or a reactivity controlled compression ignition engine, or other compression ignition engines known in the art. In one embodiment, the engine 102 is configured to combust a mixture of air, a liquid fuel such as diesel, and a gaseous fuel such as natural gas. Accordingly, the engine 102 may be fueled by gasoline, diesel fuel, biodiesel, dimethyl ether, alcohol, natural gas, propane, hydrogen, combinations thereof, or any other combustion fuel known in the art.

The engine 102 includes an engine block 104 and a cylinder head 106. The engine block 104 includes a plurality of cylinders (not shown). Each of the plurality of cylinders includes a piston (not shown) and a connecting rod (not shown). The engine 102 may include twelve cylinders arranged in a V-configuration. In other embodiments, fewer or more cylinders may be included or another configuration, such as an inline configuration may be employed. The engine 102 may be utilized for any suitable application such as motor vehicles, work machines, locomotives or marine engines, and in stationary applications such as electrical power generators.

Each cylinder includes one or more intake valves (not shown). The intake valves may be configured to supply air for combustion with the fuels in the cylinder. An intake manifold 108 may be formed or attached to the engine block 104 such that the intake manifold 108 extends over or is proximate to each of the cylinders. The engine system 100 may further include other components (not shown) such as an exhaust valve, an exhaust manifold, an aftertreatment system, and the like.

In order to supply the liquid fuel to the engine 102 for combustion purposes, a liquid fuel system (not shown) is operatively coupled with the engine 102. The fuel system may include a fuel reservoir to store the fuel, such as the diesel fuel. A fuel line may be provided to direct the fuel from the fuel reservoir to the engine 102. A fuel pump may be provided in the fuel line to pressurize and force the fuel through the fuel line. The fuel system may include multiple fuel injectors fluidly coupled to the fuel line to introduce the fuel into the cylinders. At least one fuel injector may be associated with each cylinder.

Figure 2:
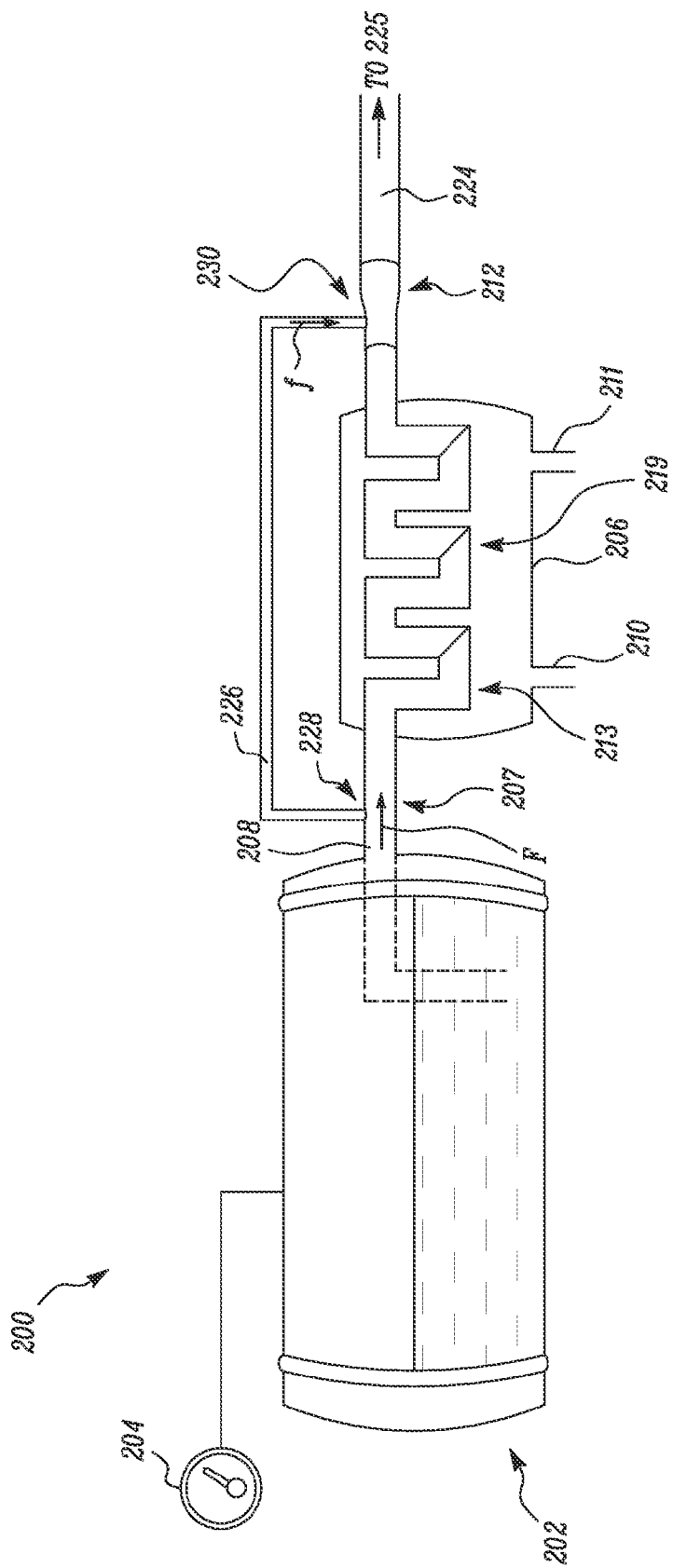
FIG. 2 is a schematic view of a natural gas system associated with the engine system.

Referring to FIG. 2, the engine 102 includes a natural gas system 200 operatively coupled with the engine 102. In one embodiment, the natural gas system 200 is configured to introduce natural gas into the intake manifold 108 of the engine system 100. In other embodiments, the natural gas may be introduced into the combustion chamber of the cylinders via an additional intake valve (not shown). In operation, the diesel fuel may cause the natural gas to ignite inside the combustion chamber.

The natural gas system 200 includes a tank 202. The tank 202 is configured to store the natural gas therein. The natural gas contained within the tank 202 is at a very low temperature and is in a liquid form. However, a relatively small quantity of the natural gas may be in a gaseous form. In one example, the temperature of the natural gas within the tank 202 may approximately lie between −160° C. and −120° C.

A fuel gauge 204 or gas gauge may be associated with the tank 202. The fuel gauge 204 may be configured to detect and send signals corresponding to a level of the natural gas contained within the tank 202. Based on the signals received from the fuel gauge 204, the tank 202 may be periodically replenished with the natural gas. A fill system (not shown) may be used to replenish the tank 202 with the natural gas. The fuel gauge 204 may include any contact type or contactless type fuel level detection device known in the art. In one example, the fuel gauge 204 may embody a mechanical float. Parameters related to the tank 202 such as size, shape, location, and material used may vary according to system design and requirements.

It should be noted that the natural gas to be introduced into the intake manifold 108 are ideally required to lie within a temperature range of approximately between −20° C. and 60° C. In order to increase the temperature of the natural gases, a heat exchanger 206 is provided downstream of the tank 202, with respect to a first stream "F" of the natural gas. The natural gas is in a liquid form at an inlet of the heat exchanger 206. The heat exchanger 206 is configured to heat the first stream "F" of the natural gas received from the tank 202. The heat exchanger 206 is in fluid communication with the tank 202 via a line 208.

The heat exchanger 206 is embodied as a vaporizer, and is configured to increase a temperature of the first stream "F" of the natural gas. The first stream "F" of the natural gas is in a vapor or gaseous form at an outlet of the heat exchanger 206. The heat exchanger 206 may include a number of convolutions, such that a first portion 213 of the heat exchanger 206 is defined by the first convolution and a second portion 219 of the heat exchanger 206 is defined by the remaining convolutions.

The first stream "F" of the natural gas flowing through the heat exchanger 206 is configured to exchange heat with a coolant. In one example, the coolant may include an engine coolant that flows through the engine system 100 in order to cool various components of the engine system 100. The coolant enters the heat exchanger 206 via a line 210. Further, after exchanging heat with the first stream "F" of the natural gas flowing through the heat exchanger 206, the coolant exits the heat exchanger 206 via a line 211. The heat exchanger 206 may embody any known heat exchanging device known in the art. The heat exchanger 206 may include a shell and tube heat exchanger, without limiting the scope of the present disclosure.

The present disclosure provides a temperature regulating assembly 212 positioned downstream of the heat exchanger 206 with respect to the first stream "F" of the natural gas. The temperature regulating assembly 212 may regulate the temperature, also referred as introduction temperature, of the natural gas prior to entry into the intake manifold 108 of the engine 102. It should be noted that the natural gas system 200 may include additional components, such as an over-pressure regulator (not shown), without limiting the scope of the present disclosure.

The structure and working of the temperature regulating assembly 212 will now be described in detail with reference to FIG. 3. The temperature regulating assembly 212 includes a conduit 214. A cross section of the conduit 214 may vary along a length thereof. The conduit 214 may have a stepped design defining a first portion 215 and a second portion 218. The conduit 214 has a circular cross-section. Alternatively, the conduit 214 may have a square or rectangular cross section, without limiting the scope of the present disclosure. A material of the conduit 214 is decided such that the material is resistive to high temperature gases.

The conduit 214 includes an inlet 216. The inlet 216 is in fluid communication with the heat exchanger 206 through the line 208 (see FIG. 2). The inlet 216 receives the first stream "F" (see FIG. 2) of the natural gas through the line 208. A mixing element 220 may be positioned at an upstream side 217 of the inlet 216 with respect to the first stream "F" of the natural gas. The mixing element 220 is configured to impart a swirling motion or turbulence in the heated first stream "F" of the natural gas entering the conduit 214. In one example, the mixing element 220 may include a swirl plate type mixing element. Alternatively, the mixing element 220 may include any known type of mixing device, without limiting the scope of the present disclosure. The conduit 214 includes an outlet 222. The outlet 222 is provided in fluid communication with the intake manifold 108 via line 224 and line 225 (see FIG. 1).

The temperature regulating assembly 212 includes a supply line 226. The supply line 226 is connected to the conduit 214 between the inlet 216 and the outlet 222 of the conduit 214. In one example, the supply line 226 is connected to the first portion 215 of the conduit 214. The supply line 226 is configured to introduce a second stream "f" of natural gas into the conduit 214. The introduction of the second stream "f" (see FIG. 2) of the natural gas is based on a temperature of the natural gas within the conduit 214. Further, a temperature of the second stream "f" is lower than the temperature of the first stream "F" of the natural gas. The second stream "f" of the natural gas may be in a liquid or a gaseous form. As shown in FIG. 2, a first end 228 of the supply line 226 is fluidly coupled to the line 208 at an upstream side 207 of the heat exchanger 206. The supply line 226 is configured to receive the second stream "f" of the natural gas from the line 208. In another example, the supply line 226 is connected downstream of the first portion 213 of the heat exchanger 206 and upstream of the second portion 219 of the heat exchanger 206, with respect to the first stream "F" of the natural gas.

Figure 3:
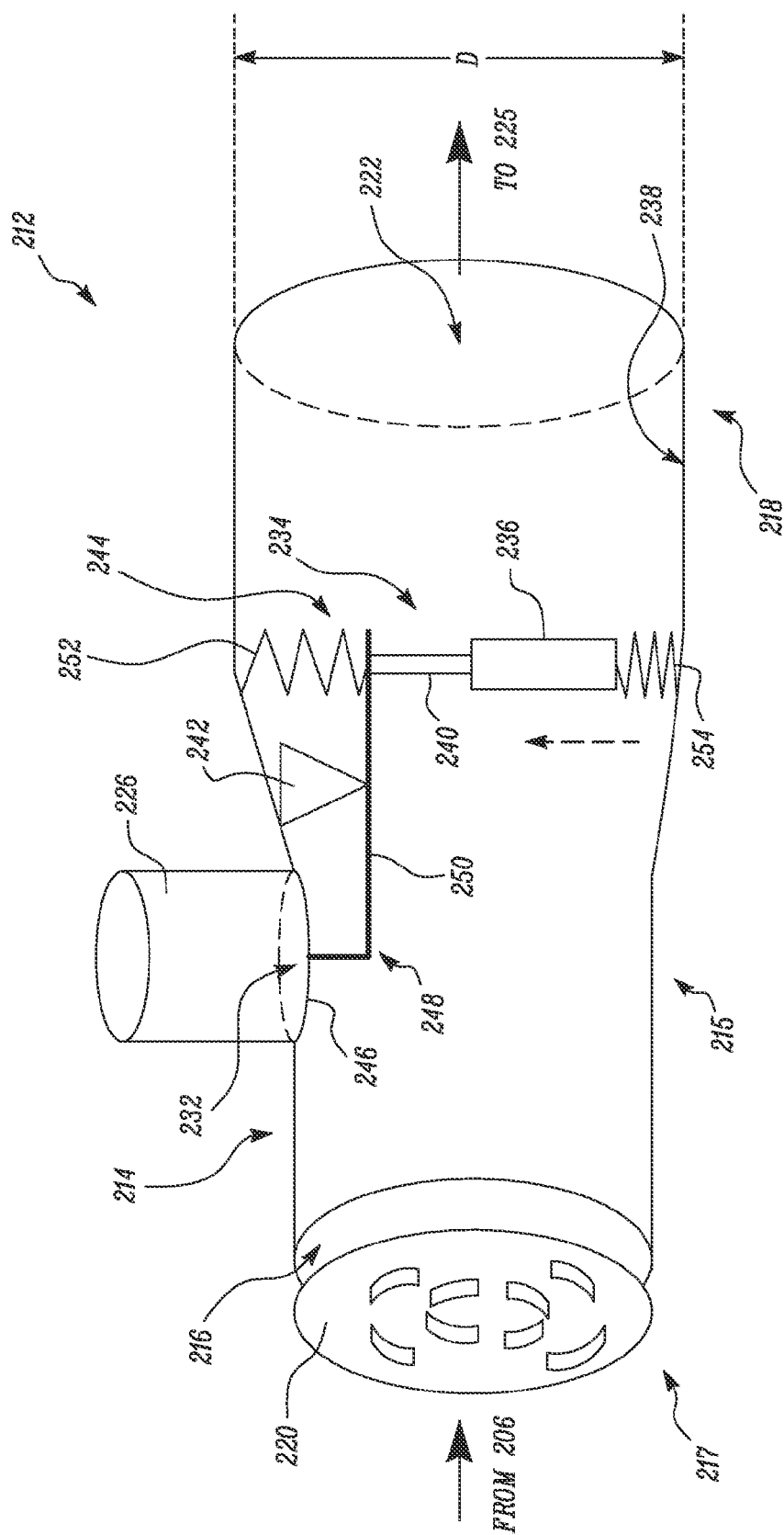
FIG. 3 is a schematic view of an exemplary temperature regulating assembly, according to one embodiment of the present disclosure.

Referring to FIG. 3, a second end 230 of the supply line 226 is fluidly coupled to the conduit 214 via a port 232. The supply line 226 is in selective fluid communication with the conduit 214 via the port 232. The port 232 may either open or close the fluid communication between the supply line 226 and the conduit 214. The opening of the port 232 causes the second stream "f" (see FIG. 2) of the natural gas from the supply line 226 to be introduced into the conduit 214.

The temperature regulating assembly 212 includes a temperature sensing assembly 234. The temperature sensing assembly 234 is provided within the conduit 214. The temperature sensing assembly 234 is configured to control the opening or closing of the port 232 based on the temperature of the natural gas within the conduit 214.

The temperature sensing assembly 234 includes a sensing element 236. The sensing element 236 is configured to any one of expand or contract based on the temperature of the natural gas within the conduit 214. More particularly, the sensing element 236 is configured to selectively expand along a diameter "D" of the conduit 214 based on the temperature of the natural gas within the conduit 214. It should be noted that after passing through the heat exchanger 206, the first stream "F" (see FIG. 2) of the natural gas entering the conduit 214 through the inlet 216 may be at a relatively high temperature. The sensing element 236 may be disposed on an inner bottom wall 238 of the conduit 214. The sensing element 236 may include mounting elements (not shown) to mount the sensing element 236 within the conduit 214. The mounting elements are not shown in the accompanying figures for clarity purposes.

The sensing element 236 includes a temperature sensitive element (not shown). The temperature sensitive element is configured to expand based on the temperature of the natural gas within the conduit 214. In one embodiment, the temperature sensitive element may include wax. In such an example, the sensing element 236 may embody a wax pellet or a wax thermostatic element. When brought in contact with the natural gas, the sensing element 236 transforms heat energy into mechanical energy using the thermal expansion of the melting wax.

The sensing element 236 includes a piston 240. The piston 240 extends or retracts respectively based on the pressure applied on the piston 240 by the expansion or contraction of the wax within the sensing element 236. More particularly, the piston 240 of the sensing element 236 is configured to selectively extend along the diameter "D" of the second portion 218 of the conduit 214, based on the temperature of the natural gas within the conduit 214. A direction of the extension of the piston 240 is shown using a dotted arrow in the accompanying figures. It should be noted that the sensing element 236 may include any other temperature sensitive element instead of wax. More particularly, the sensing element 236 may include any material that expands when heated and contracts when cooled. Further, the sensing element 236 may embody any temperature sensitive device known in the art, without limiting the scope of the present disclosure.

The temperature regulating assembly 212 also includes a fulcrum 242. Further, the sensing element 236 is operatively coupled to a first side 244 of the fulcrum 242. Additionally, a cover element 246 is operatively coupled to a second side 248 of the fulcrum 242. The cover element 246 is associated with the port 232, such that the opening of the port 232 is based on a movement of the cover element 246. When the piston 240 of the sensing element 236 extends, the piston 240 of the sensing element 236 is configured to actuate the movement of the cover element 246 in order to either open or close the port 232. More particularly, when the piston 240 extends, the piston 240 causes a lever 250 to pivot about the fulcrum 242. The cover element 246 is coupled to the lever 250 at the second side 248 of the fulcrum 242. As the lever 250 pivots, the cover element 246 opens the port 232, and the second stream "f" of the natural gas from the supply line 226 is introduced into the conduit 214 via the port 232. In one example, the lever 250 may include a stopper (not shown) associated therewith. The stopper may be configured to avoid movement of the lever 250 beyond a certain limit. The fulcrum 242, the cover element 246, and the port 232 may be disposed on an inner upper wall 249 of the conduit 214.

The temperature regulating assembly 212 includes a first spring element 252. The first spring element 252 is configured to return the lever 250 to its original position when the piston 240 retracts, thereby causing the cover element 246 to close the port 232. Further, the temperature regulating assembly 212 includes a second spring element 254. In an event of undesirable expansion of the piston 240, the second spring element 254 is configured to hold the sensing element 236 and avoid any excessive movement thereof.

During operation, the natural gas present in the conduit 214 contacts the sensing element 236. Since the sensing element 236 is sensitive or responsive to temperature, on contact with the natural gas that is above a given threshold temperature, the wax in the sensing element 236 may melt. This melting of the wax in turn causes the pressure to be applied on the piston 240, thereby causing an extension thereof. Further, on extension, the piston 240 contacts the lever 250 at the first side 244 of the fulcrum 242. A continual movement of the piston 240 causes the lever 250 to pivot about the fulcrum 242. The pivoting of the lever 250 about the fulcrum 242 causes the cover element 246 to actuate and open the port 232. The opening of the port 232 causes the second stream "f" of the natural gas from the supply line 226 to be introduced into the conduit 214.

As the second stream "f" of the natural gas enters the conduit 214, the relatively cooler second stream "f" of the natural gas mixes with the natural gas within the conduit 214. In one embodiment, the turbulence created in the first stream "F" of the natural gas at the upstream side 217 of the inlet 216 may cause the second stream "f" of the natural gas to mix uniformly therewith. The introduction of the second stream "f" of the natural gas causes the temperature of the natural gas within the conduit 214 to decrease. As the temperature of the natural gases in the conduit 214 decreases, the wax in the sensing element 236 cools down and contracts. The contraction of the wax further causes the piston 240 to retract. Further, as the piston 240 retracts, the first spring element 252 causes the lever 250 to pivot about the fulcrum 242 and causes the cover element 246 to close the port 232, thereby preventing further inflow of the second stream "f" of the natural gas into the conduit 214.

The inflow of the second stream "f" of the natural gas is restricted till the wax in the sensing element 236 melts again based on the contact with the natural gas from the heat exchanger 206. After controlling the temperature of the natural gas, the natural gas may exit the outlet 222 of the conduit 214 and may flow into the intake manifold 108 via the line 224 (see FIG. 2). In some embodiments, the natural gas may flow through a filter (not shown), a pressure regulator 114, and a gas shut-off valve 112, before being introduced into the intake manifold 108.

Although the above description of the temperature sensing assembly 234 is mechanically operated, one of ordinary skill in the art may appreciate that the temperature sensing assembly 234 may alternatively include any known electronic, pneumatic, or hydraulic sensing means that may respond to temperature changes of the natural gas present within the conduit 214. Further, the operation of the temperature sensing assembly 234 in association with selective communication of the supply line 226 with the conduit 214 as explained above is exemplary in nature and does not limit the scope of the present disclosure. For example, the fluid communication between the supply line 226 and the conduit 214 may alternatively be controlled by electronic means associated with the temperature sensing assembly 234.

INDUSTRIAL APPLICABILITY

Excessive heating of the natural gas in the heat exchanger 206 may affect temperature sensitive components of the engine system 100 when brought in contact with the natural gas within the conduit 214. The temperature regulating assembly 212 of the present disclosure controls the temperature of the natural gas within the conduit 214 flowing downstream of the heat exchanger 206. The temperature regulating assembly 212 includes the sensing element 236 that is configured to allow the inflow of the second stream "f" of the natural gas into the conduit 214. The stream of the second stream "f" of the natural gas decreases the temperature of the natural gas within the conduit 214 prior to introduction into the intake manifold 108.

The temperature regulating assembly 212 disclosed herein allows better and quick control of the temperature of the natural gas exiting the conduit 214 via the outlet 222. The sensing element 236 of the temperature regulating assembly 212 quickly responds based on the temperature of the natural gas within the conduit 214.

The temperature regulating assembly 212 does not include any costly components for controlling the temperature of the natural gas within the conduit 214. Hence, the temperature regulating assembly 212 is less expensive to manufacture and operate. Further, the temperature regulating assembly 212 is a stand-alone device and is can be serviced easily.

Figure 4:
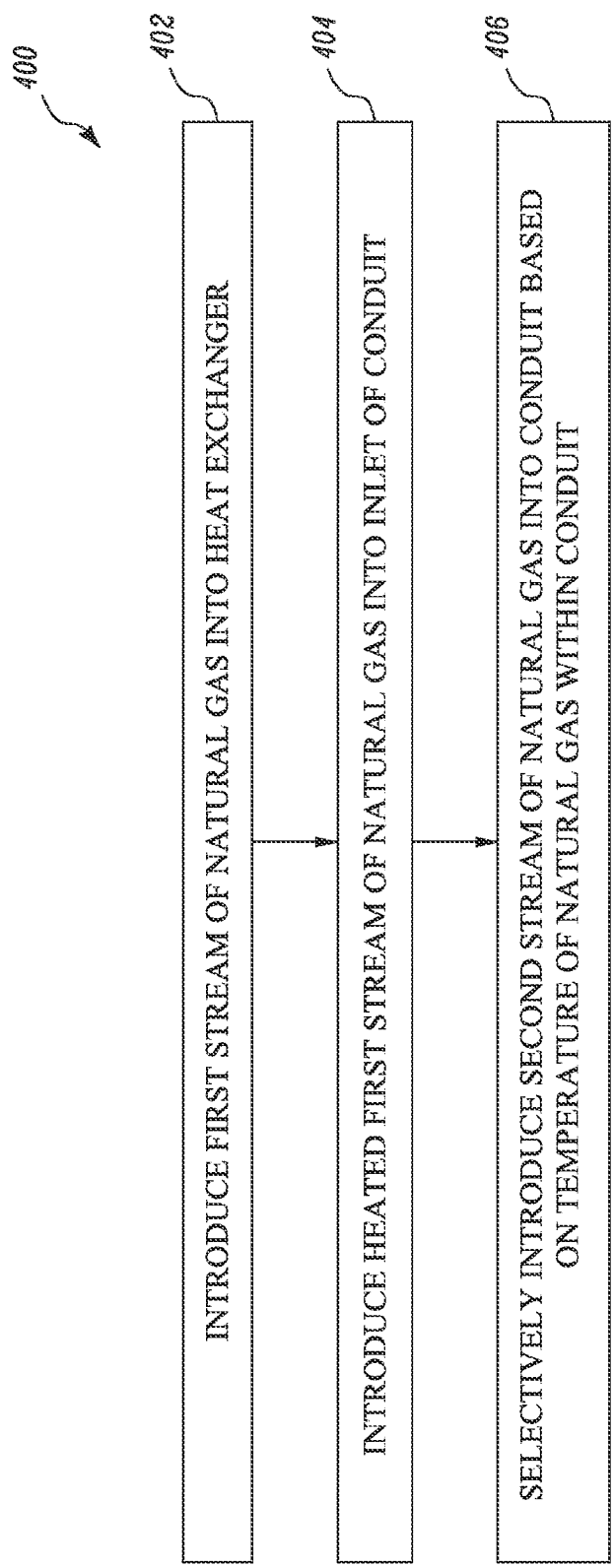
FIG. 4 is a method for regulating an introduction temperature of natural gas into cylinders of the engine system.

FIG. 4 is a flowchart for a method 400 of regulating the introduction temperature of the natural gas into the intake manifold 108 of the engine 102. At step 402, the first stream "F" of the natural gas is introduced into the heat exchanger 206.

At step 404, the heated first stream "F" of the natural gas is introduced into the inlet 216 of the conduit 214. Further, the turbulence is created in the heated first stream "F" of the natural gas entering the conduit 214 by the mixing element 220. At step 406, the second stream "f" of the natural gas is introduced into the conduit 214 based on the temperature of the natural gas within the conduit 214. The temperature of the second stream "f" of the natural gas is lower than the temperature of the first stream "F" of the natural gas Further, the cover element 246 associated with the port 232 of the supply line 226 is selectively actuated based on the temperature of the natural gas within the conduit 214. The cover element 246 is actuated by the expansion or contraction of the sensing element 236 provided within the conduit 214 based on the temperature of the natural gas within the conduit 214. Further, the port 232 of the supply line 226 is opened based on the actuation of the cover element 246. The stream of the second stream "f" of the natural gas is introduced into the conduit 214, based on the opening of the port 232. Further, on the introduction of the second stream "f" of the natural gas, the temperature of the natural gas within the conduit 214 decreases. The natural gas is then introduced into the intake manifold 108 of the engine 102 through the outlet 222.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A natural gas system for an intake manifold of a dual fuel engine, the natural gas system comprising:
 a feed line structured to receive a flow of natural gas from a tank and to divide the flow of natural gas into a first stream of natural gas and a second stream of natural gas;
 a heat exchanger configured to receive the first stream of natural gas from the feed line and to exchange heat with the first stream of natural gas passing therethrough; and
 a temperature regulating assembly positioned downstream of the heat exchanger with respect to the first stream of the natural gas, the temperature regulating assembly comprising:
  a conduit having an inlet configured to receive the first stream of natural gas and an outlet;
  a supply line in fluid communication with the feed line upstream of the heat exchanger and in selective fluid communication with the conduit between the inlet and the outlet of the conduit, the supply line configured to receive the second stream of natural gas from the feed line and to introduce the second stream of natural gas into the conduit, wherein a temperature of the second stream is lower than a temperature of the first stream; and
  a temperature sensing assembly provided within the conduit, wherein the introduction of the second stream is based on a temperature of the natural gas within the conduit.

2. The natural gas system of claim 1 further comprising a port associated with the conduit, wherein the second stream of the natural gas is introduced into the conduit based on an opening of the port.

3. The natural gas system of claim 2 further comprising a cover element associated with the port, wherein the opening of the port is based on a movement of the cover element.

4. The natural gas system of claim 1, wherein the temperature sensing assembly comprises a sensing element configured to any one of expand and contract based on the temperature of the natural gas within the conduit.

5. The natural gas system of claim 4, wherein the sensing element is configured to selectively expand along a diameter of the conduit based on the temperature of the natural gas within the conduit.

6. The natural gas system of claim 4, wherein the sensing element includes a wax pellet.

7. The natural gas system of claim 1, wherein the supply line is connected upstream of the heat exchanger.

8. The natural gas system of claim 1, wherein the supply line is connected downstream of a first portion of the heat exchanger and upstream of a second portion of the heat exchanger.

9. A dual fuel engine system comprising:
a tank configured to store natural gas;
a feed line structured to receive a flow of natural gas from the tank and to divide the flow of natural gas into a first stream of natural gas and a second stream of natural gas;
a heat exchanger in fluid communication with the tank by way of the feed line, the heat exchanger configured to receive the first stream of natural gas from the feed line and to exchange heat with the first stream of natural gas passing therethrough;
a temperature regulating assembly positioned downstream of the heat exchanger with respect to the first stream of natural gas, the temperature regulating assembly comprising:
a conduit having an inlet and an outlet;
a supply line in fluid communication with the feed line upstream of the heat exchanger and in selective fluid communication with the conduit via a port downstream of the heat exchanger, the supply line configured to receive the second stream of natural gas from the feed line and to introduce the second stream of natural gas into the conduit, wherein a temperature of the second stream is lower than a temperature of the first stream; and
a temperature sensing assembly provided within the conduit, the temperature sensing assembling configured to control an opening of the port based on a temperature of the natural gas within the conduit; and
an intake manifold in fluid communication with the outlet of the conduit.

10. The dual fuel engine system of claim 9 further comprising a mixing element positioned upstream of the inlet.

11. The dual fuel engine system of claim 9 further comprising a cover element associated with the port, wherein the opening of the port is based on a movement of the cover element.

12. The dual fuel engine system of claim 9, wherein the temperature sensing assembly comprises a sensing element configured to any one of expand and contract based on the temperature of the natural gas within the conduit.

13. The dual fuel engine system of claim 9, wherein the supply line is coupled upstream of the heat exchanger.

14. The dual fuel engine system of claim 9, wherein the supply line is connected upstream of a first portion of the heat exchanger and downstream of a second portion of the heat exchanger.

15. A method for regulating an introduction temperature of natural gas into an intake manifold of a dual fuel engine, the method comprising:
producing a first stream of natural gas and a second stream of natural gas from a natural gas supply;
introducing the first stream of natural gas into a heat exchanger;
introducing the first stream of natural gas after having been heated to an increased temperature by way of the heat exchanger into a conduit structured to fluidly connect to an intake manifold in a dual fuel engine; and
selectively introducing the second stream of natural gas into the conduit based on a temperature of natural gas within the conduit,
wherein the second stream of natural gas flows in parallel with the first stream of natural gas between the natural gas supply and the conduit and is not heated to the increased temperature by way of the heat exchanger, such that a temperature of the second stream of natural gas upon introduction into the conduit is lower than a temperature of the first stream of natural gas upon introduction into the conduit.

16. The method of claim 15, wherein selectively introducing the second stream of natural gas further comprises:
actuating a cover element associated with a port of a supply line based on the temperature of the natural gas within the conduit; and
opening the port of the supply line based on the actuation.

17. The method of claim 16 further comprising:
any one of expanding and contracting a sensing element provided within the conduit based on the temperature of the natural gas within the conduit.

18. The method of claim 15 further comprising:
decreasing the temperature of the natural gas within the conduit based on the introduction.

19. The method of claim 15 further comprising:
introducing the natural gas into an intake manifold of an engine.

20. The method of claim 15 further comprising:
introducing turbulence in the heated first stream of the natural gas entering the conduit.

* * * * *